(12) United States Patent
Stiller et al.

(10) Patent No.: US 6,592,181 B2
(45) Date of Patent: Jul. 15, 2003

(54) TUNNEL CORD TRIM RETAINER

(75) Inventors: Edwin L. Stiller, Auburn Hills, MI (US); Robert Powell, Romulus, MI (US); Sharon St. Pierre, Pinckney, MI (US)

(73) Assignee: Intier Automotive Inc., Novi, MI (US)

( * ) Notice: Subject to any disclaimer, the term of this patent is extended or adjusted under 35 U.S.C. 154(b) by 0 days.

(21) Appl. No.: 09/945,036

(22) Filed: Aug. 31, 2001

(65) Prior Publication Data
US 2003/0042773 A1 Mar. 6, 2003

(51) Int. Cl.[7] .............................................. A47C 31/00
(52) U.S. Cl. ................... 297/218.2; 297/452.6
(58) Field of Search ........................... 297/218.2, 218.3, 297/218.4, 452.6

(56) References Cited

U.S. PATENT DOCUMENTS 2,801,682 A * 8/1957 Fridolph .................. 297/218.2
3,630,572 A * 12/1971 Homier ................ 297/218.1 X
3,951,455 A * 4/1976 Bandel et al. ............... 297/226
3,988,034 A * 10/1976 Fister, Jr. ............. 297/452.6 X
4,609,226 A * 9/1986 Yoshizawa ............... 297/452.6
5,605,373 A * 2/1997 Wildern et al. .......... 297/218.3
5,716,096 A 2/1998 Pryde et al.
5,820,213 A 10/1998 Severinski

* cited by examiner

Primary Examiner—Anthony D. Barfield
(74) Attorney, Agent, or Firm—Clark Hill PLC

(57) ABSTRACT

A tunnel cord assembly for removably attaching a trim cover to a contoured, cellular foam pad is comprised of a selvedge strip slidably encasing the cord and a bayonet-type fixture at the ends of the cord. The selvedge strip is sewn to the trim cover, which attaches to the foam pad. The foam pad includes a front surface, an opposite back surface, a plurality of trenches and a plurality of holes within the trenches. Each end of the tunnel cord is pulled through a hole that extends through the foam pad from the front surface, which is covered by the trim cover, to the back surface. A locking device is then removably coupled between the back surface of the foam and the bayonet-type fixture, preventing the cord from retracting through the hole back to the front surface of the pad, and thereby securing the trim cover to the foam pad.

9 Claims, 2 Drawing Sheets

TUNNEL CORD TRIM RETAINER

BACKGROUND OF THE INVENTION

1. Technical Field

The subject invention relates to a cushion assembly. In particular, this invention relates to a cushion assembly having a tunnel cord for attaching a trim cover to a foam pad.

2. Description of the Related Art

An automotive vehicle includes seat assemblies for supporting occupants within the vehicle above a floorpan. Typically, a seat assembly includes a seat cushion and a seat back each comprising a foam pad covered by a trim cover. Ideally, the cover should be fairly easy and inexpensive to attach to the foam pad, but should resist developing problems such as wrinkling and shifting around on the pad. Trim covers are attached to the foam pad of seat assemblies in a variety of ways. Some of the most common ways include the use of hook and loop fasteners, adhesive, hog rings, and drawstrings. While these methods satisfy the function of attaching a trim cover to a foam pad without much wrinkling or shifting, they tend to be expensive and can be labor intensive. Therefore, there is a need in the field for a simpler and less expensive way to attach trim covers to foam pads of seat assemblies while still maintaining the styling and quality of the current methods.

SUMMARY OF THE INVENTION

This invention relates to attaching a trim cover to a foam pad of a cushion assembly, typically for use in an automotive vehicle. According to one aspect of the invention, there is provided a tunnel cord assembly for removably attaching a trim cover to a contoured, cellular foam pad. The tunnel cord assembly is comprised of a selvedge strip slidably encasing a tunnel cord and a bayonet-type fixture secured to the ends of the cord. The selvedge strip is sewn to the trim cover, thereby attaching the entire tunnel cord assembly to the trim cover. The trim cover attaches to the contoured, cellular foam pad. The foam pad includes a front surface, an opposite back surface, a plurality of trenches and a plurality of holes within the trenches. Each end of the tunnel cord is pulled through a hole that extends through the contoured, cellular foam pad from the front surface, which is covered by the trim cover, to the back surface. Once through the hole, a locking device is removably coupled between the back surface of the foam and the bayonet-type fixture. Upon engagement of the locking device, the tunnel cord is prevented from retracting through the hole back to the front surface of the pad, thereby securing the trim cover to the foam pad.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENTS

Figure 1:
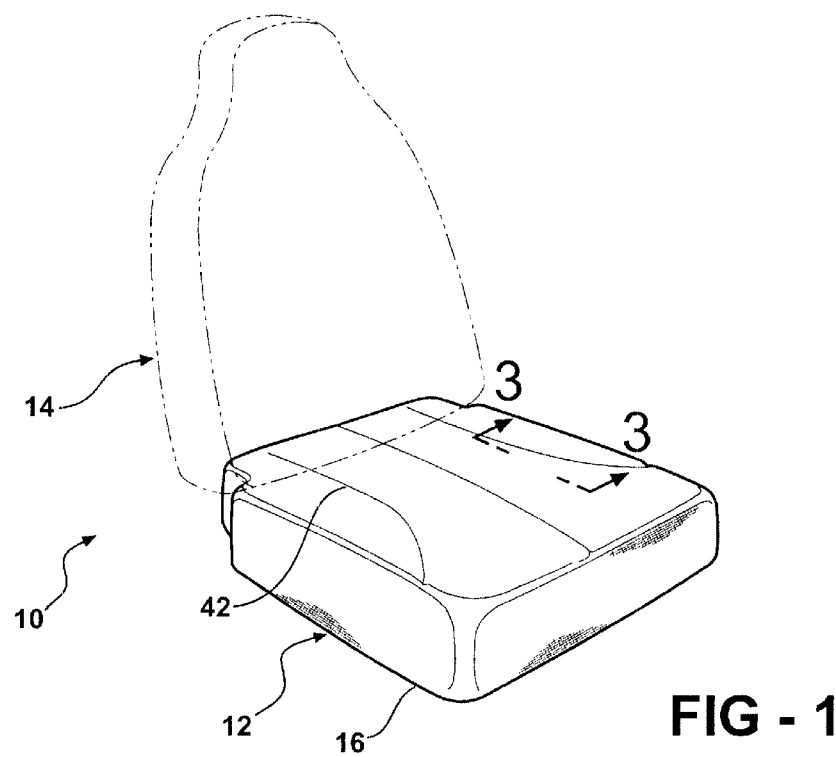
FIG. 1 is a perspective view of a seat assembly according to one aspect of the invention.

Referring to the figures, FIG. 1 shows a seat assembly 10 for supporting an occupant of an automotive vehicle. The seat assembly 10 comprises a seat cushion 12 and a seat back 14. The seat cushion 12 is covered by a trim cover 16. Although the current invention is only shown applied to the seat cushion 12, the invention could be used to attach a trim cover to any type of cushion, i.e., seat back, head rest, arm rest, etc.

Figure 2:
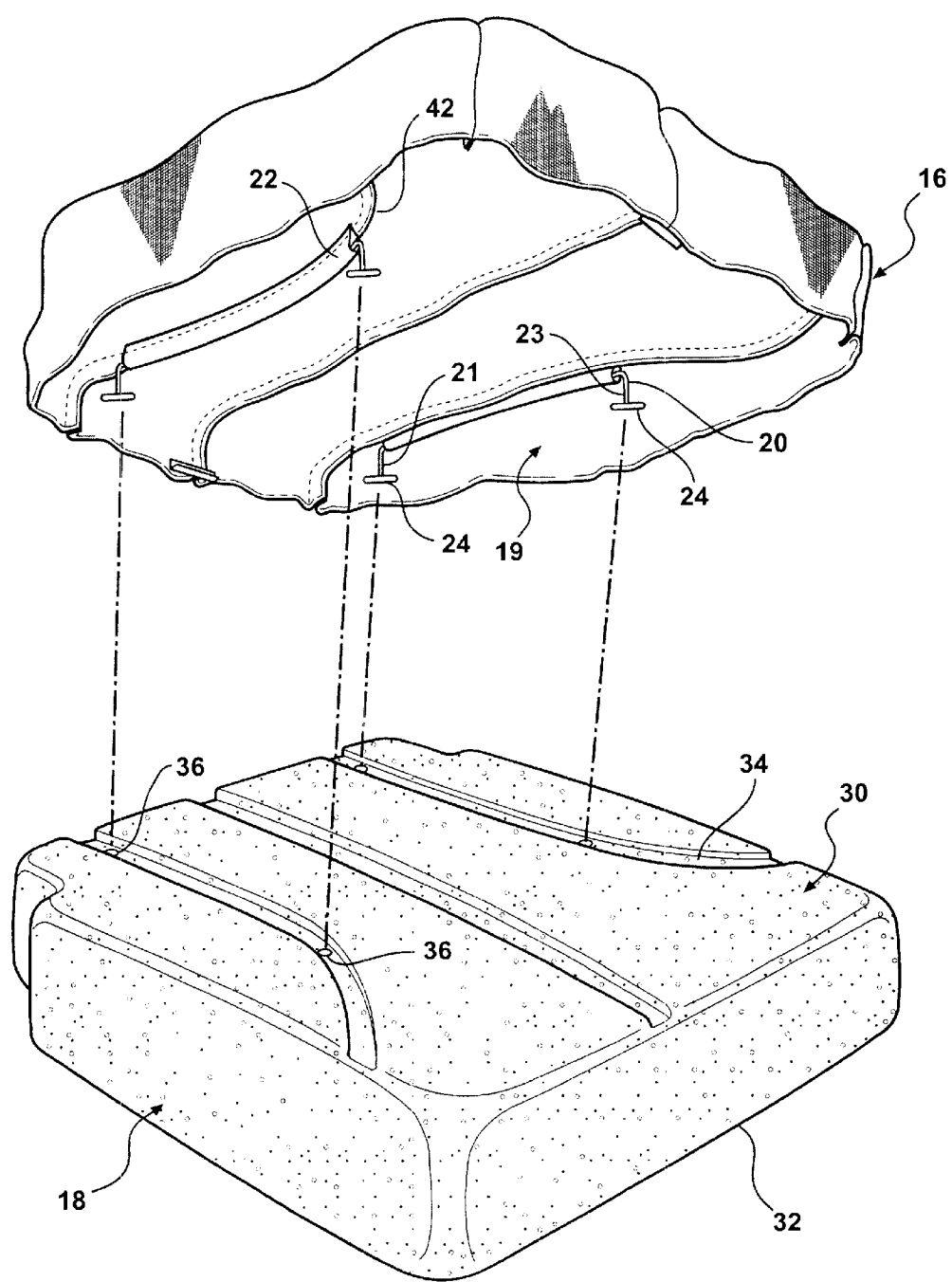
FIG. 2 is a partially exploded view of a trim cover and a contoured, cellular foam pad comprising a seat cushion.

Referring now to FIG. 2, the Figure shows a trim cover 16 and a contoured, cellular foam pad 18. The trim cover 16 could be a variety of materials, including vinyl, leather or cloth. The cellular foam pad 18 could be a material such as polyurethane. A tunnel cord assembly 19 is coupled between the trim cover 16 and foam pad 18 for securing the trim cover 16 to the foam pad 18. The tunnel cord assembly 19 includes a tunnel cord 20 of a woven rope-type or similar material that is substantially non-elastic, providing a firm retention of the trim cover 16 to the foam pad 18. The tunnel cord 20 extends longitudinally between opposite first and second ends 21, 23. A bayonet-type fitting 24 is fixedly secured to each of the ends 21, 23. As will be explained hereinbelow, the bayonet-type fitting 24 could be a variety of things, including an elongated metal fitting, as shown, or even a knot.

The tunnel cord 20 is slidably encased by an elongated selvedge strip 22, which has been folded longitudinally, forming a channel to slidably receive and retain the cord 20 therein. The selvedge strip 22 is a type of flexible cloth material and is fixedly attached to the trim cover 16. Selvedge strip 22 could be attached by various methods, including sewing, adhesive, and hook and loop fasteners. Selvedge strip 22 is longitudinally attached to trim cover 16 such that a substantial length of selvedge strip 22 is fixedly attached to trim cover 16. As a result, a substantial length of cord 20 is also operatively attached to trim cover 16, leaving the ends of the cord 20 unattached.

The foam pad 18 includes a front surface 30 and a back surface 32. The front surface 30 further includes trenches 34. As will be seen, trenches 34 operate to recess selvedge strips 22 below front surface 30. The trenches 34 further include a plurality of holes 36 which extend through the foam pad 18 from the front surface 30 to the back surface 32.

Figure 3:
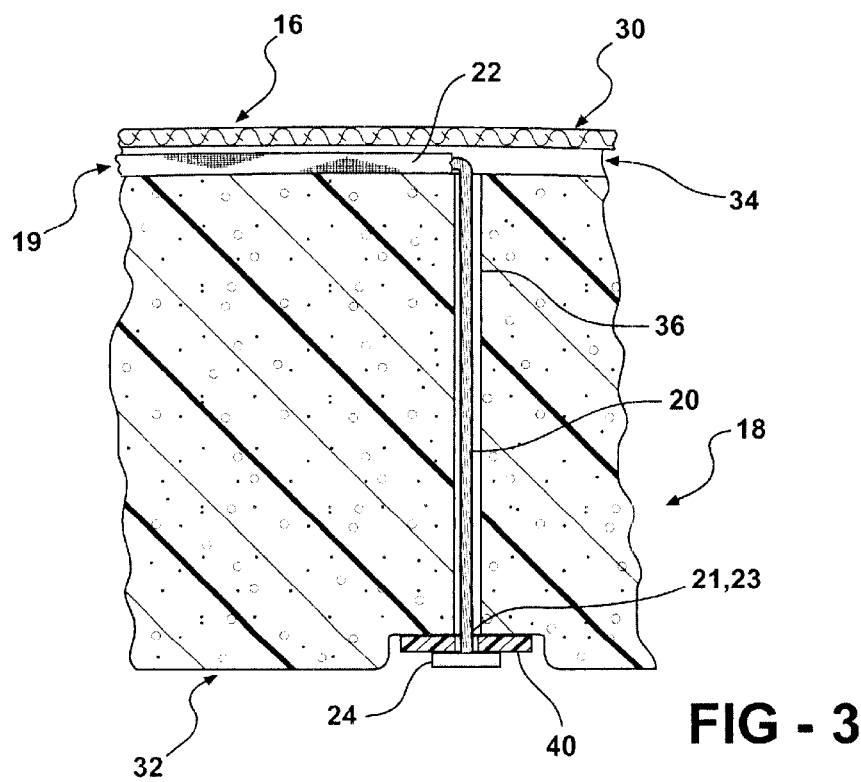
FIG. 3 is a cross-sectional view taken along line 3—3 of FIG. 1.

In the process of attaching trim cover 16 to front surface 30 of the foam pad 18, the ends 21, 23 of tunnel cord 20 which are not attached to trim cover 16 are pulled substantially perpendicularly away from the trim cover 16 and through the holes 36 of foam pad 18. As best shown in FIG. 3, once an end 21, 23 of cord 20 is pulled through to the back surface 32, a locking device 40 is coupled between the end 21, 23 and the back surface 32. The locking device 40 is generally a disc-type washer having a center slot for receiving the end of the cord 20 therein. The locking device 40 is designed to secure the trim cover 16 by not allowing the bayonet-type fitting 24 to retract back through the hole 36 to the front surface 30. The locking device 40 could be various materials such as plastic or metal.

As indicated previously, the bayonet-type fitting 24 could be a variety of shapes and materials. Any type of fitting that is shaped and sized so as to be able to be pulled longitudinally through a hole 36 of the foam pad 18 and then be rotated, bent, or otherwise engaged so as to be prevented from being pulled back through the hole 36 to the front surface 30 of the foam pad 18, would accomplish the function.

For example, a pre-formed knot could be used if it were shaped and sized to pass through a hole 36 of the foam pad 18 and if the locking device 40 was designed to secure the knot in place at the back surface 32. It should be appreciated that many different types and combinations of bayonet-type fittings 24 and locking devices 40 could accomplish this feature of the present invention.

Once secured, the selvedge strip 22 sits in a trench 34 of the foam pad 18, thereby resulting in the trim cover 16 lying flat against the front surface 30 of the foam pad 18. Typically, the trenches 34 of the foam pad 18 will line up with the contours and seams 42 of the trim cover 16. When the selvedge strips 22 are attached to the trim cover 16 at the contours and seams 42, the trenches 34 enable the selvedge strips 22 to sit below the front surface 30 of the foam pad 18. It should be appreciated that this creates a more comfortable sitting environment for passengers.

The invention further includes a method of attaching the trim cover 16 to the foam pad 18. The method includes positioning the trim cover 16 adjacent to the front surface 30 of the foam pad 18. Each of first and second ends 21, 23 of the tunnel cord 20 are aligned with corresponding holes 36 in the foam pad 18. Once aligned, the first end 21 and second end 23 of the tunnel cord 20 are pulled through the corresponding holes 36 from the front surface 30 to the back surface 32 of the foam pad 18. The first end 21 and the second end 23 are then anchored to the back surface 32 of the foam pad 18 by coupling a locking device 40 between each of the first end 21 and the second end 23 and the back surface 32 of the foam pad 18 to secure the trim cover 16 to the foam pad 18.

The above-described embodiment of the invention is intended to be an example of the present invention and alterations and modifications may be effected thereto, by those of skill in the art without departing from the scope of the invention.

What is claimed is:

1. A cushion assembly for an automobile including:
a contoured, cellular foam pad having a front surface and an opposite back surface, with a plurality of holes extending therebetween;
a trim cover for covering said front surface of said foam pad;
at least one tunnel cord extending longitudinally between opposite first and second ends, a portion of said tunnel cord passes through a pair of said holes in said foam pad wherein a portion of said cord is secured to said trim cover arid each of said first and second ends is anchored to said back surface of said foam pad to secure said trim cover against said front surface;
said trim cover includes an elongated selvedge strip fixedly secured thereto for slidably encasing and securing at least a portion of said tunnel cord to said trim cover; and
said cord is longitudinally secured to said trim cover by said elongated selvedge strip whereby each of said first and second ends extends substantially perpendicularly away from said trim cover through said holes in said foam pad to provide a taught and substantially wrinkle-free attachment of said trim cover to said front surface of said foam pad.

2. An assembly as set forth in claim 1 further including a locking device removably coupled between each of said first and second ends of said cord and said back surface for anchoring said ends of said tunnel cord to said back surface of said foam pad.

3. An assembly as set forth in claim 2 wherein said end of said tunnel cord further includes a bayonet-type fitting to prevent said tunnel cord from retracting through said hole from said back surface to said front surface of said foam pad.

4. An assembly as set forth in claim 3 wherein said tunnel cord is substantially non-elastic to firmly retain said trim cover against said front surface of said foam pad.

5. An assembly as set forth in claim 4 wherein said trim cover includes a distal circumferential edge and at least one substantially J-shaped hook attached to a portion of said edge adopted for securing said trim cover and said foam pad to a frame at a seat assembly.

6. An assembly as set forth in claim 1 wherein said foam pad further includes at least one trench to recess said selvedge strip and said tunnel cord below said front surface of said foam pad.

7. An assembly as set forth in claim 6 wherein each of said holes is positioned within the width and length of said trench.

8. A method of attaching a trim cover to a foam pad having a front surface and opposite back surface with holes extending therethrough, wherein the trim cover includes a tunnel cord assembly comprising an elongated selvedge strip slidably encasing a tunnel cord having first and second ends, said method comprising the steps of:
positioning the trim cover adjacent to the front surface of the foam pad;
securing the tunnel cord to the trim cover in a longitudinal direction such that each of the first and second ends of the tunnel cord extends substantially perpendicularly away from the trim cover;
aligning each of the first and second ends of the tunnel cord with the corresponding holes in the foam pad;
pulling each of the first and second ends of the tunnel cord through the holes in the foam pad from the front surface to the back surface of the foam pad, thereby providing a taught and substantially wrinkle-free attachment of the trim cover to the front surface of the foam pad; and
anchoring the first end and the second end of the tunnel cord to the back surface of the foam pad to secure the trim cover to the foam pad.

9. A method as set forth in claim 8 further including anchoring each end of the tunnel cord to the back surface of the foam pad by coupling a locking device between the end of the cord and the back surface of the foam pad.

* * * * *

UNITED STATES PATENT AND TRADEMARK OFFICE
CERTIFICATE OF CORRECTION

PATENT NO.     : 6,592,181 B2
DATED          : July 15, 2003
INVENTOR(S)    : Stiller et al.

It is certified that error appears in the above-identified patent and that said Letters Patent is hereby corrected as shown below:

Column 3,
Line 45, "arid" should read -- and --.

Column 4,
Lines 1 and 46, "taught" should be -- taut --.

Signed and Sealed this

Twenty-first Day of October, 2003

JAMES E. ROGAN
*Director of the United States Patent and Trademark Office*